INVENTOR.
ROBERTO MUÑOZ DE LEON

United States Patent Office 3,400,516
Patented Sept. 10, 1968

3,400,516
AIR FILTER
Roberto Munoz de Leon, Providencia 332-1,
Colonia del Valle, Mexico
Filed Sept. 26, 1966, Ser. No. 581,839
Claims priority, application Mexico, Sept. 24, 1965,
84,847
3 Claims. (Cl. 55—228)

ABSTRACT OF THE DISCLOSURE

An air filter has body and cup members separated by a partition having a central opening, a set of spiral vanes in the cup extending into oil maintained at a constant level, and a set of spiral vanes within a filter in the body and covered by a cap. The vanes define a continuous closed spiral path to guide air in a single direction of rotation from an inlet over the oil and through the filter to an outlet, to provide a maximum path length and filtering area.

---

This invention relates to a new air filter for internal combustion engines, which provides a better air filtering action, since the air has a greater contact both with the oil and the filtering element which are inside the filter. The dimensions of said air filter do not need to be increased in order to obtain said results.

The air, contaminated with dust particles, upon entering any air filter of this type, first contacts the oil in the lower part of said filter, and then contacts the filtering element located in the upper portion of said filter.

It is evident that if the air has a larger contact area both with the oil surface and with the filtering element, necessarily a better filtering action of the same is obtained; that is, a greater oil surface contacted by the air and a greater dimension of the filtering element will necessarily provide a better filtering action. This invention has made possible without increasing the oil volume or the filtering element, that the air upon entering the filter, has a greater contact with both, thus resulting in a better and more efficient filtration.

The foregoing is the essential feature of this invention, but it must be understood that this is not the only novel feature of this invention, since the invention provides a series of advantageous and novel features which will be described hereinafter, with reference to the accompanying drawings in which.

The air filter, in the preferred embodiment of this invention comprises the following components:

Essentially, the filter is divided in two parts which are respectively body $b$, of a tapered shape and the larger of both parts, and cup $v$, which is detachable, that is, it can be separated from body $b$.

Body $b$ has in its interior, the filtering element, which does not occupy all of the interior area of said body $b$ but on the contrary, occupies, only the space comprised between the steel, cylindrical screens $h$ and $r$. Screen $h$ acts to prevent the movement of the filtering element towards the center of body $b$, and screen $r$ prevents said filtering element from moving toward space E. That is, screens $h$ and $r$ secure the filtering element, thus preventing its movement respectively to the center or to the periphery of body $b$.

Figure 1:
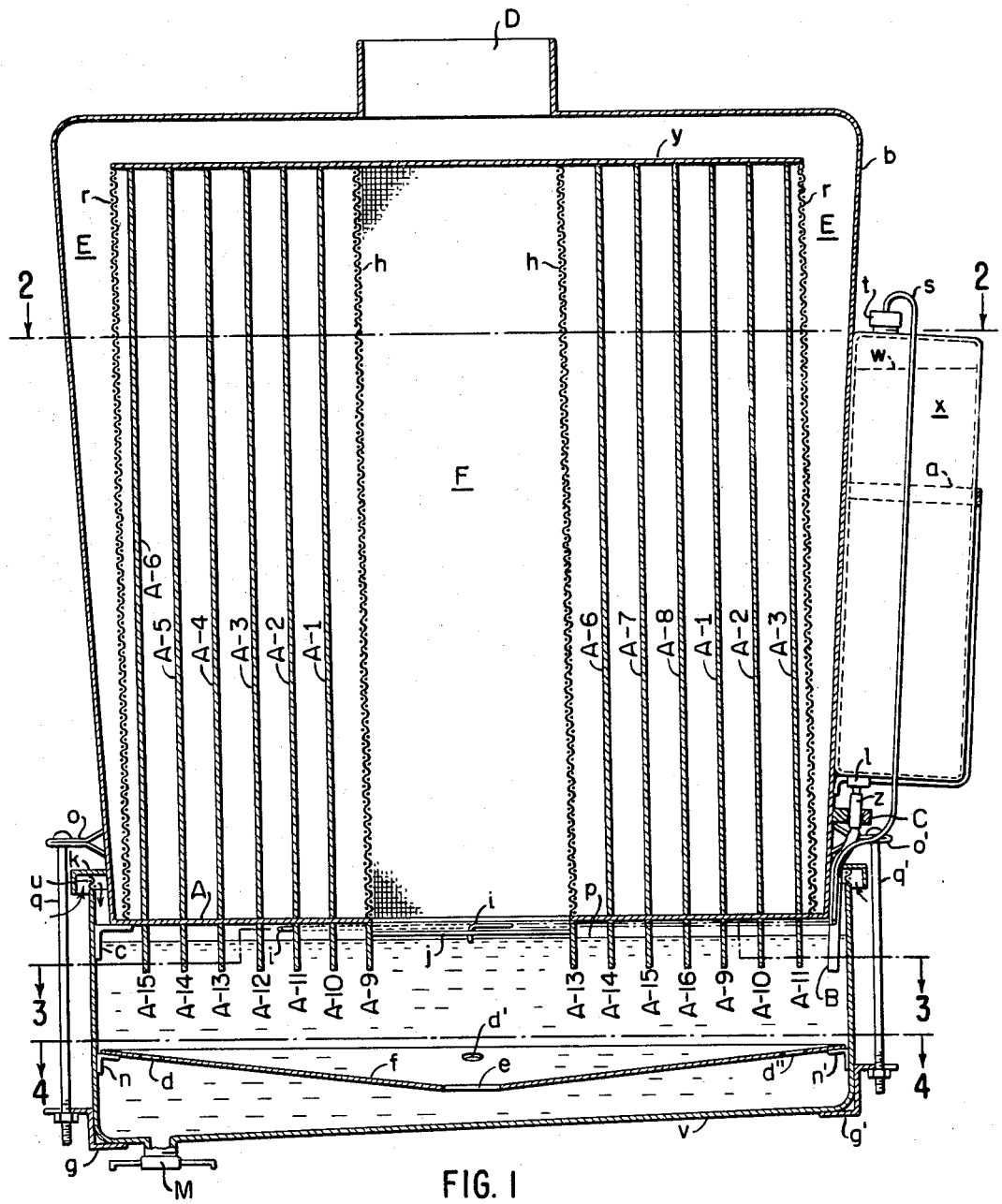
FIG. 1 is a vertical cross sectional view showing the air filter of this invention.
Figure 2:
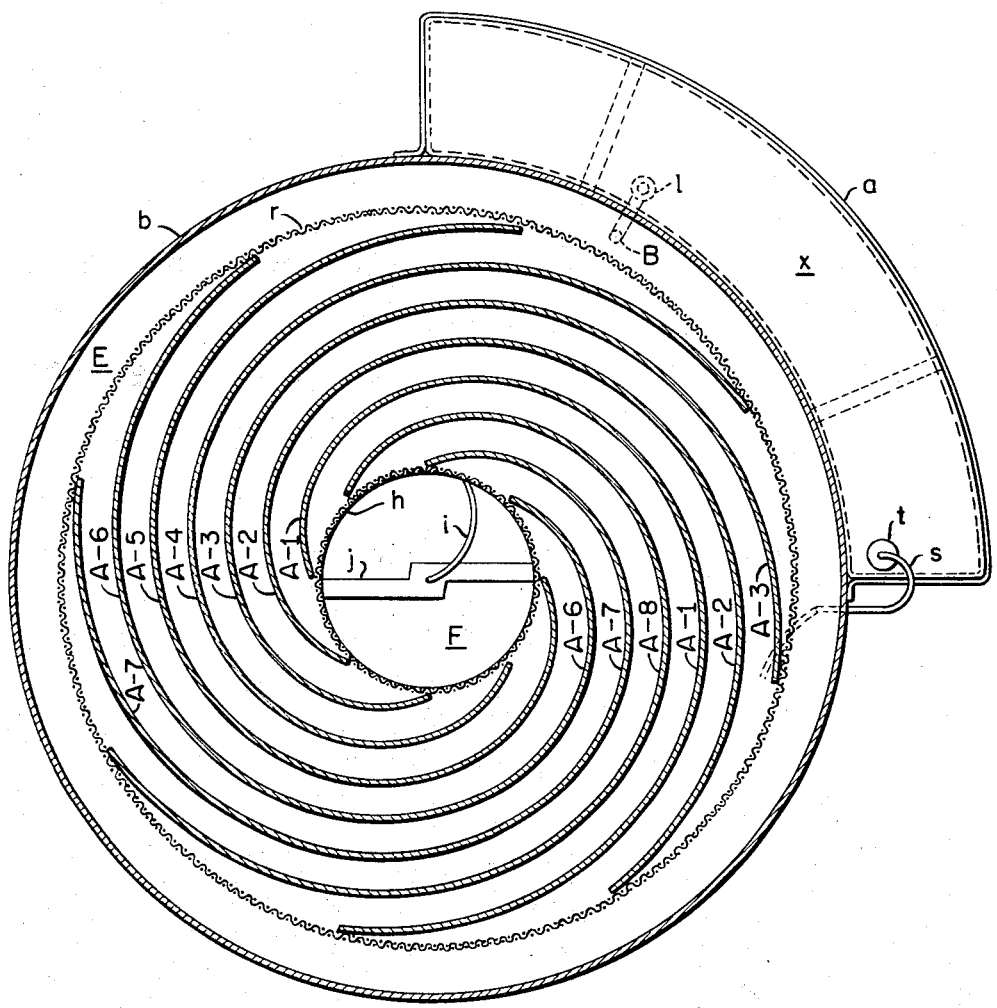
FIG. 2 is a horizontal section of the air filter taken at 2—2 of FIG. 1.
Figure 3:
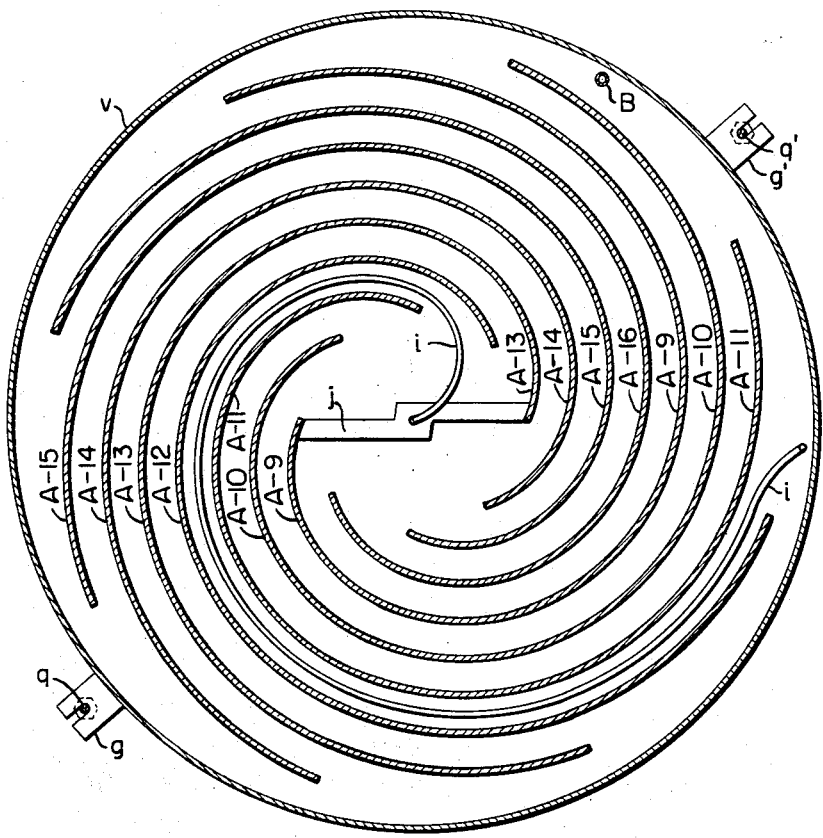
FIG. 3 is a horizontal section of the air filter taken at 3—3 of FIG. 1.
Figure 4:
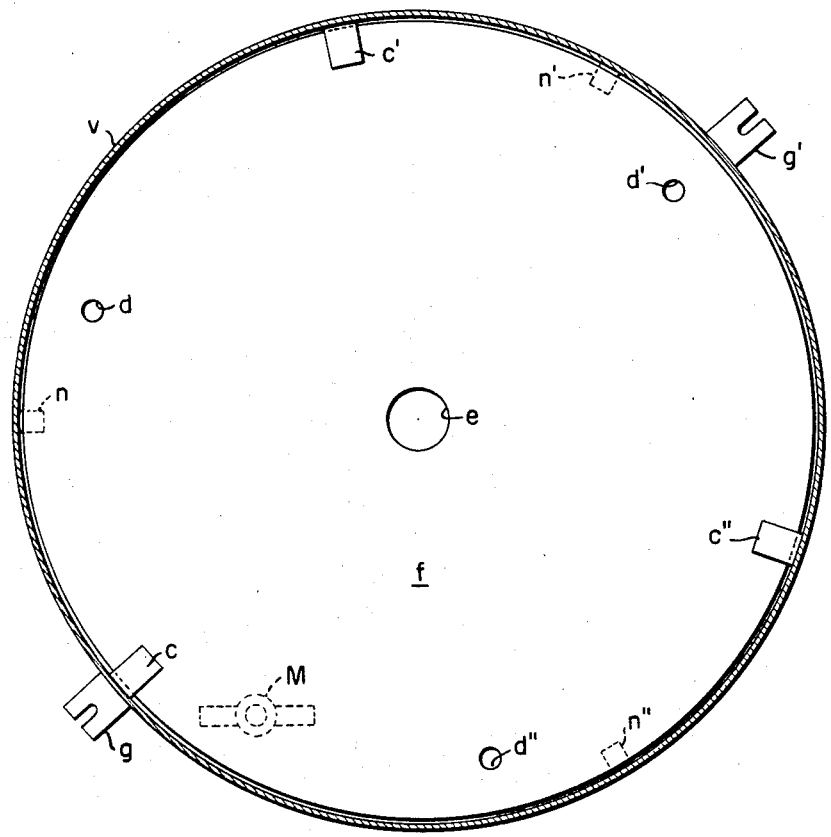
FIG. 4 is a horizontal section of the air filter taken at 4—4 of FIG. 1.

Affixed to body $b$ is an oil storage reservoir marked with letter $x$ (see FIG. 2) which provides a permanent oil level in reservoir $v$. The description and operation thereof, will be explained in complete detail hereinafter. Reservoir $v$ has a disc $f$, in its interior, to separate the impure oil from the clean oil inside reservoir $v$, a detailed description of its operation and components will be made hereinafter.

With the foregoing indications, in mind, the following is a detailed description of this invention.

The air dust particles from the atmosphere, enters into the filter through the space between the lower portion of body $b$, and the upper portion of reservoir $v$, said space or opening has two protections: the first one being protector $k$ welded around body $b$ which acts to prevent foreign particles from entering into the reservoir $v$; the second protection being the cylindrical screen $u$ welded to the upper portion of reservoir $v$ and which acts to prevent foreign material such as leaves, papers and litter from entering into the reservoir $v$.

After the air has entered through the above mentioned opening, it will drop through the space formed between the lower portion of body $b$ and the upper portion of reservoir $v$, and it will contact the oil surface inside reservoir $v$; and thence it will follow its way to the center of reservoir $v$, said path is not straight but in a spiral pattern, thus providing the air with a greater contact with the oil surface; this brings about a better air filtration. The spiral shaped path followed by the air is limited or directed by the lower vanes marked with numbers A–9, A–10, A–11, A–12, A–13, A–14 and A–15, said lower vanes are welded to the circular cap A which forms the lower portion of body $b$.

After the air has followed the spiral shaped path from the periphery to the center of the filter, it will come out to throat $f$ and will start to enter through the cylindrical screen $h$ towards the filtering element located inside body $b$ limited on its sides by cylindrical screens $h$ and $r$. The path followed by the air through the filtering element, parting from the center to the periphery of the filter, is not straight, it will follow a spiral shaped path. Due to the spiral path followed by the air through the filtering element, the area contacted by the air stream will increase step by step as the air moves along said path, and in the end of the filtering element, the filtering area is approximately 5.6 times larger than the area in present filters.

The speed at which the air passes through a larger area, is lower, considering a fixed air volume. This lower rate of flow of the air permits foreign particles to be trapped more easily by the filtering element, and therefore, provides a better filtering action.

On the other hand, since there is a larger contact area of the air with the filtering element, the air volume passing through a specific unit of the filtering element, is smaller and therefore, said unit of the filtering element will be kept cleaner, thus having a greater filtering power.

It is important to indicate that the spiral shaped path followed by the air through the filtering element, is limited at its sides by the upper vanes marked with numbers A–1, A–2, A–3, A–4, A–5, A–6, A–7 and A–8. Said vanes are welded at their lower extremity to the circular cap A and at their upper extremity to the circular cap $y$; The path imparted to the air by said vanes as it passes through the filtering elements, has the same direction as that imparted by the lower vanes when the air passed through the oil surface because the upper vanes are displaced in opposite direction to the lower vanes. In other words, when the air comes up through neck F it will not have to change its circular direction to enter the filtering element, but following the same circular direction it will smoothly enter the filtering element, thus preventing the air from making an unnecessary effort, which would be required if the air had to change its direction.

After the air has passed through the filtering element in a spiral path, it will pass to space e and up to throat d, and thence to the turbo compressor, carburetor or to any place where the perfectly filtered and clean air is required.

In air filters, in which the filtration is performed contacting first the oil and from thence a filtering element, it is of vital importance that the oil level be maintained at a predetermined height, otherwise, the contact of the air with the oil will not be that required to obtain a a maximum filtering action.

At present, it is very difficult to maintain the desired oil level in air filters of this type, since the oil level is not visible, on the contrary, in order to check the oil level it is necessary to uncover the filter; that is, to separate the reservoir containing the oil from the body in which the filtering element is located, which is a rather complicated and bothersome operation.

In view of the above disadvantages, this invention has made possible to maintain a constant and permanent oil level, visible, from the exterior and which can be refilled without uncovering the filter; the following is a complete description of the operation and component parts of this system, which provides a constant and permaanent oil level in the air filter.

As can be seen, body b has attached thereto, by means of bracket a, an oil reservoir x to supply oil to reservoir v. Said filling operation is carried out as follows:

Oil reservoir x is provided in its upper left portion with a plastic cap t for setting a plastic tube s to the upper throat of the oil storage reservoir; said plastic tube s is connected at its other end with tube i, which goes down on one side of body b to the lower partt hereof, and follows thereafter a spiral like path to the center of the filter; that is, tube i will follow the path of the lower vanes up to bar j, which is welded at each of its ends to a lower vane, and which is slightly higher than the oil level p, said bar j allows the end of tube i to be secured by means of a hole in the central part, and crossed by said end of tube i. Now, after having described the position of tubes i and s, reference will be made to the important function performed by the same.

If the oil level in reservoir v is at its height, or predetermined position, the end of the tube i will be in contact with the oil, and therefore, it will not have interior atmospheric pressure, but on the contrary, should the oil level in reservoir v decrease either by dragging of oil particles by the air being in contact with the oil surface, in the path followed by the same to the carburetor or turbo compressor, the lower end of tube i which was before in contact with the oil, will now have an atmospheric pressure which will be carried by said tube up to the oil surface w located in the storage reservoir x. Said atmospheric pressure in surface w, will cause the oil to descend through the plastic tube z, which is secured by means of a plastic cap l to the lower neck of storage reservoir x, to follow its descending path to the steel tube B which is welded to the lower and exterior portions of body b and serving, as tube z to permit the flow of clean oil from the storage reservoir x to cup v. Said flow of clean oil will continue until the oil level p of cup v reaches its normal predetermined height, thus blocking the end of tube i and preventing an atmospheric pressure to be exercised on the oil surface w of the storage reservoir x.

It is also convenient to indicate that there is a clamp C welded to body b, for chocking the plastic tube z thus permitting that at the time of supplying the oil to the storage reservoir x, no oil will pass through tube B, since this would cause, if cup v is installed in body b, that the oil level p would exceed its normal predetermined height, and if said cup is not installed, for instance, in a cleaning operation, oil would flow to the exterior.

Heretofore both the operation of the air filter of this invention and the operation of the air oil supply system which allows a constant and predetermined oil level, have been described. The manner in which clean oil is separated from unclean oil inside cup v will now be described. Said oil separation is essentially carried out by a circular cap f in a funnel-like shape inside cup v supported at its periphery by three brackets marked with letters n, n', and n'' which are welded to the inside wall of said cup v.

Said circular cap f has a central orifice e which permits oil impregnated with dust particles, and therefore having a greater density, to descend through said orifice e until its settles in the bottom of cup v, which will have a slight slant towards the discharge valve M, permitting periodic discharge of the dustier and heavier oil, said oil discharge operation will cause the automatic feeding of clean oil from the storage reservoir x to cup v. It should be understood that not all of the unclean oil can be expelled through the discharge valve M, because the unclean oil tends to form a paste which cannot be expelled through said valve.

Besides acting to expel the dirty oil from cup v, the discharge valve M serves to indicate if the oil level in cup v has exceeded the predetermined level, due to the entrance of liquid, such as water or the like, through the opening formed between body b and cup v or through any other part of the filter. When a given volume of oil is expelled through the discharge valve M, an equal volume of oil should flow from reservoir x into cup v. If said volume of oil does not flow from reservoir x to cup v, the oil level in cup v has exceeded its predetermined level.

Said funnel-shaped cap f does not only have the central hole e mentioned above, but also has three orifices d, d', and d'' of a smaller diameter that the central hole e which allows clean oil to pass through them when displaced by dirty oil which descends through central hole e.

Heretofore, we mentioned that cup v is disengaceable from body b; both are attached by means of screws g and g' which fasten cup v and body b; said fastening operation is carried out because in the upper portion screws g and g' are attached to brackets o and o', which are welded to body b, and in their lower portion screws g and g' are secured by the double angles g and g', which are welded to the lower portion of cup v, when the nuts of said screws are tightened a pressure is exercised, thus permitting the fastening of body b and cup v.

The joint of cup v and body b, does not require for the correct operation of the air filter of this invention, the use of any packing or sealing device since the only inlet for the air is the opening formed between the lower portion of body b and the upper portion of cup v.

I claim:

1. An air filter comprising: an upper body member containing an annular filter element and a lower cup member adapted to provide an oil reservoir; a partition between the body member and cup member having a central opening permitting passage of air from the center of the cup member to the center of the body member; means forming an air inlet opening between the upper part of the cup member and the lower part of the body member beneath said partition; said body member being formed with a clean air outlet; first spiral vanes attached to and depending from said partition, each of said first spiral vanes being continuous and starting at said inlet opening and extending continuously without interuption to said central opening, each of said first spiral vanes terminating above the bottom of said cup member; second spiral vanes within said annular filter element, extending upwardly from said partition, and defining an open throat extending upwardly from said central opening, said first and second spiral vanes extending in the same angular direction; a cap mounted on the upper ends of said second spiral vanes within said body member; means for maintaining a constant oil level partially immersing said first spiral vanes in said cup member; said vanes, partition, cap, and oil level means defining a continuous closed spiral path from said air inlet opening through said first spiral vanes to said central opening and into said throat, and a continuous closed spiral path having the same rotational direction from said throat through said second spiral vanes and said annular filter element to said air outlet.

2. An air filter as defined by claim 1 including inside the cup member a funnel shaped cap having a central opening and a side opening, means supporting said cap in spaced relation to the bottom of said cup member, whereby dirty heavy oil may sink to beneath the cap and clean oil may rise to the air contacting surface.

3. An air filter as recited by claim 1, in which said oil level means comprises: an enclosed oil reservoir located at an elevation higher than the cup member; an oil feed tube communicating from within the reservoir to within said cup member; and an air vent communicating said reservoir above the oil level therein and terminating within said cup member at the desired oil level.

References Cited

UNITED STATES PATENTS

| | | | |
|---|---|---|---|
| 693,273 | 2/1902 | Jervis | 261—73 |
| 1,212,193 | 1/1917 | Doherty | 55—235 X |
| 1,349,608 | 8/1920 | Donaldson | 55—237 |
| 1,661,980 | 3/1928 | Voight | 55—235 X |
| 1,673,732 | 6/1928 | Brooks | 55—227 X |
| 1,701,782 | 2/1929 | Kogstrom | 55—330 X |
| 1,702,804 | 2/1929 | Winslow | 55—235 |
| 1,751,324 | 3/1930 | Green | 55—237 |
| 2,236,273 | 3/1941 | Nash. | |
| 2,287,629 | 6/1942 | Mieras. | |
| 2,335,456 | 11/1943 | Seitz | 55—237 X |
| 2,384,699 | 9/1945 | Russell et al. | 55—239 |
| 2,418,381 | 4/1947 | Wegmann | 55—455 X |
| 2,509,510 | 5/1950 | Lee et al. | 55—225 |
| 2,570,369 | 10/1951 | Murray | 261—73 X |
| 2,688,377 | 9/1954 | Nutting | 55—229 |
| 2,807,504 | 9/1957 | Bloxson | 261—73 X |
| 2,970,671 | 2/1961 | Warner | 55—455 X |
| 3,264,804 | 8/1966 | Sendelbech | 55—225 X |

FOREIGN PATENTS

| | | |
|---|---|---|
| 116,702 | 3/1953 | Australia. |
| 861,303 | 12/1952 | Germany. |

HARRY B. THORNTON, *Primary Examiner.*

D. E. TALBERT, JR., *Assistant Examiner.*